UNITED STATES PATENT OFFICE.

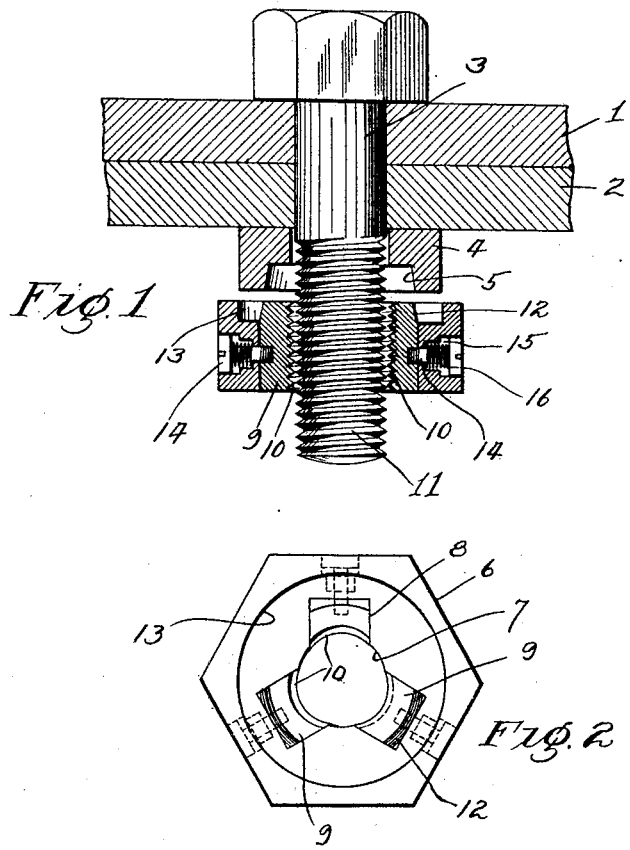

WILLIAM T. HOWARD, OF OAKLAND, CALIFORNIA.

QUICK-ACTING NUT.

1,404,296. Specification of Letters Patent. Patented Jan. 24, 1922.

Application filed February 21, 1921. Serial No. 446,900.

*To all whom it may concern:*

Be it known that I, WILLIAM T. HOWARD, a citizen of the United States, residing at the city of Oakland, in the county of Alameda and State of California, have invented certain new and useful Improvements in the Quick-Acting Nuts, of which the following is a specification.

This invention relates to improvements in quick acting nuts, its object being to provide a fastening device of the nut character which may be removed from a bolt without turning it along the entire length of the bolt threads.

With my improved holding device, a few turns withdraws the threaded portion of the nut from the threads of the bolt thereby enabling the nut to be moved axially along the threads without turning. Another object of the invention is to provide a device which to a certain degree acts as a lock nut, the construction being such that the continued turning of the nut forces the threaded portions into tighter engagement with the bolt threads thereby making it more secure against accidentally becoming loose.

With these and other objects in view, my invention consists in certain novel features of construction, combinations and arrangement of parts herein illustrated and more particularly pointed out in the appended claims.

Reference being had to the accompanying drawing forming a part of this specification:

Figure 1 is a view partly in elevation and partly in section showing one form of my improved holding device.

Figure 2 is an end view of the nut member.

Referring to corresponding parts in the several views by the same numerals of reference: 1 and 2 denote members which are held together by means of the bolt 3. The latter is here illustrated of the machine bolt type, but my device is just as applicable to any screw threaded device. My invention more particularly comprises a member or washer 4, having in one face a conical recess 5. This member seats on the outer surface of the held members and the bolt extends through a clearance hole in it, though for certain purposes this member may also be in threaded engagement with the bolt threads.

The turnable member generally comprises a square or hexagon nut 6 having an opening 7, the diameter of which is slightly greater than the outside diameter of the bolt. Extending radially from this opening are a number of recesses 8, in each of which is slidably mounted a block 9. The faces of these blocks have threads as shown at 10 to cooperate with the threads 11 on the bolt. The inner ends of the blocks are beveled as shown at 12 which bevel is on the same angle as the conical recess 5, being adapted to engage the surface of the latter as the two parts are brought into contact. The face of the nut adjacent the washer is recessed as indicated at 13, to provide clearance for the rim of the washer due to the formation of the conical recess.

Extending from the rear of each block is a screw or other holding member 14. As here shown this holding member is in screw threaded engagement with the block and is provided with an enlarged head which fits the counter-bored recess 15 in the nut. Small coiled springs 16 surround the holding member and seat against the inner end of the recess 15 and against the under side of the head of screw 14. These springs thus tend to press the screw outwardly and consequently pull the blocks into their respective recesses.

In Figure 1, the device is illustrated as it is about to be applied to the bolt and in this operation the nut is then pressed inwardly until the beveled surface of the blocks engage the conical recess, causing the threads 10 to be forced into engagement with the threads 11. Then on rotation of the nut, the blocks are further moved radially towards the bolt threads and come into closer contact therewith. It would be apparent that the more the nut is turned the tighter would be the engagement between the thrads of blocks and those of the bolt hence the greater will be the force required to accidentally disengage the nut. In removing the nut it is only necessary to give a few turns or until the nut has been withdrawn in the conical recess a distance that the springs may retract the blocks a sufficient amount to enable the threads on the blocks to clear those of the bolt. Under such conditions, the nut may be moved longitudinally over the bolt threads without further turning.

Having thus described my invention, I claim as new and wish to cover by Letters Patent:

1. A device of the character described, comprising the combination with an externally screw-threaded bolt of a ring member having a frusto-conical recess concentric with the bolt, a nut having a central opening and radial recesses extending from the opening, blocks radially movable in said recesses, screw threads formed on the inner faces of said blocks for engagement with the threads of said bolt and beveled faces on said blocks for engagement with the conical recess.

2. A device of the character described, comprising the combination with an externally screw-threaded bolt of a nut having a central opening and slots extending radially from said opening, blocks slidably mounted in said slots, screw threads on said blocks for engagement with the threads of said bolt and means for causing a radial displacement of said blocks that the threads thereof will engage the threads of the bolt.

3. A device of the character described comprising the combination with a screw threaded member of a nut having radial slots, blocks radially movable in said slots said blocks having segments of screw threads for engagement with the threads of said member, and means for causing a radial displacement of the block so that the threads thereof engage the threads of said member.

4. A device of the character described comprising the combination with a screw threaded member of a nut having radial slots, blocks radially movable in said slots said blocks having segments of screw threads for engagement with the threads of said member, a member having a frusto-conical recess substantially non-axially movable with respect to the threaded member and beveled faces on the rear of said blocks for engagement with the conical sides of said recess to cause a radial displacement of said blocks.

5. A device of the character described comprising the combination with an externally screw-threaded bolt of a ring member having a frusto-conical recess concentric with the bolt, a nut having a central opening and radial recesses extending from the opening, blocks radially movable in said recesses, screw threads formed on the inner faces of said blocks for engagement with the threads of said bolt, beveled faces on said blocks for engagement with the conical recess, means for holding said blocks in the slots and springs acting in opposition to the movement caused by the engagement of the beveled faces with the conical recess.

In testimony whereof I affix my signature.

WILLIAM T. HOWARD.